United States Patent
Spitzer

(10) Patent No.: US 9,201,670 B2
(45) Date of Patent: Dec. 1, 2015

(54) SYSTEM, METHOD, AND COMPUTER PROGRAM PRODUCT FOR DETERMINING WHETHER PARAMETER CONFIGURATIONS MEET PREDETERMINED CRITERIA

(75) Inventor: John F. Spitzer, Wimberley, TX (US)

(73) Assignee: NVIDIA Corporation, Santa Clara, CA (US)

( * ) Notice: Subject to any disclaimer, the term of this patent is extended or adjusted under 35 U.S.C. 154(b) by 253 days.

(21) Appl. No.: 13/543,184

(22) Filed: Jul. 6, 2012

(65) Prior Publication Data

US 2014/0013303 A1 Jan. 9, 2014

(51) Int. Cl.
*G06F 9/44* (2006.01)
*G06F 9/445* (2006.01)

(52) U.S. Cl.
CPC .................. *G06F 9/44505* (2013.01)

(58) Field of Classification Search
CPC ............ G06F 11/3668; G06F 11/3676; G06F 9/44505
USPC ....................................................... 717/121
See application file for complete search history.

(56) References Cited

U.S. PATENT DOCUMENTS

| | | |
|---|---|---|
| 3,688,278 A | 8/1972 | Sauvan et al. |
| 5,086,386 A | 2/1992 | Islam |
| 5,671,351 A | 9/1997 | Wild et al. |
| 5,958,058 A | 9/1999 | Barrus |
| 5,987,624 A | 11/1999 | Eglit |
| 6,044,476 A | 3/2000 | Ote et al. |
| 6,059,842 A * | 5/2000 | Dumarot et al. ............... 717/153 |
| 6,314,479 B1 | 11/2001 | Frederick et al. |
| 6,646,653 B2 | 11/2003 | San et al. |
| 6,753,881 B1 | 6/2004 | Callway et al. |
| 6,768,519 B2 | 7/2004 | Fujita et al. |
| 6,847,358 B1 | 1/2005 | Ford et al. |
| 6,850,973 B1 | 2/2005 | Larson et al. |
| 6,901,580 B2 | 5/2005 | Iwanojko et al. |
| 7,034,828 B1 | 4/2006 | Drebin et al. |
| 7,080,247 B2 | 7/2006 | Rochford, II et al. |
| 7,243,371 B1 | 7/2007 | Kasper et al. |
| 7,293,201 B2 | 11/2007 | Ansari |
| 7,299,382 B2 | 11/2007 | Jorapur |
| 7,603,445 B1 | 10/2009 | Fehrle |
| 7,626,944 B1 | 12/2009 | Riddle |
| 7,778,936 B2 | 8/2010 | Adhikari |
| 8,171,342 B2 | 5/2012 | Wu |

(Continued)

FOREIGN PATENT DOCUMENTS

| | | |
|---|---|---|
| TW | 413798 B | 12/2000 |
| TW | 201205427 A | 2/2012 |

OTHER PUBLICATIONS

Nyanchama, "The Role Graph Model and Conflict of Interest", Feb. 1999, pp. 3-33.*

(Continued)

*Primary Examiner* — Duy Khuong Nguyen
(74) *Attorney, Agent, or Firm* — Zilka-Kotab, PC

(57) ABSTRACT

A system, method, and computer program product are provided for determining whether parameter configurations meet predetermined criteria. In use, predetermined criteria associated with a software element are identified. Additionally, it is determined whether each of a plurality of different parameter configurations meets the criteria, utilizing a directed acyclic graph (DAG).

15 Claims, 10 Drawing Sheets

(56) References Cited

U.S. PATENT DOCUMENTS

| | | | |
|---|---|---|---|
| 8,276,133 | B1 | 9/2012 | Lebaredian et al. |
| 8,280,864 | B1 | 10/2012 | Herz et al. |
| 8,296,781 | B1 | 10/2012 | Lebaredian et al. |
| 9,092,573 | B2 | 7/2015 | Spitzer et al. |
| 2001/0008021 | A1 | 7/2001 | Ote et al. |
| 2002/0073415 | A1 | 6/2002 | Kim et al. |
| 2002/0083228 | A1 | 6/2002 | Chiloyan et al. |
| 2002/0095501 | A1 | 7/2002 | Chiloyan et al. |
| 2003/0023841 | A1* | 1/2003 | Atherton et al. ............... 713/1 |
| 2003/0033519 | A1 | 2/2003 | Buckman et al. |
| 2003/0055930 | A1 | 3/2003 | Haneda |
| 2003/0140333 | A1 | 7/2003 | Odaka et al. |
| 2003/0225917 | A1 | 12/2003 | Partamian et al. |
| 2004/0187103 | A1 | 9/2004 | Wickham et al. |
| 2004/0199615 | A1 | 10/2004 | Philyaw |
| 2004/0212610 | A1 | 10/2004 | Hamlin |
| 2004/0249618 | A1 | 12/2004 | Fine et al. |
| 2005/0076002 | A1 | 4/2005 | Williams et al. |
| 2005/0104888 | A1 | 5/2005 | Ford et al. |
| 2005/0120208 | A1 | 6/2005 | Dobson |
| 2005/0133067 | A1 | 6/2005 | Bergman |
| 2005/0225639 | A1 | 10/2005 | Somers |
| 2006/0112057 | A1* | 5/2006 | Lai ................................ 706/47 |
| 2006/0132473 | A1 | 6/2006 | Fuller et al. |
| 2006/0188174 | A1 | 8/2006 | Minadakis |
| 2007/0002347 | A1 | 1/2007 | Lai et al. |
| 2007/0066403 | A1 | 3/2007 | Conkwright |
| 2007/0098288 | A1 | 5/2007 | Raskar et al. |
| 2007/0172140 | A1 | 7/2007 | Kokemohr |
| 2007/0268204 | A1 | 11/2007 | Kawabe |
| 2007/0277134 | A1 | 11/2007 | Zhang et al. |
| 2007/0300203 | A1 | 12/2007 | Jeong et al. |
| 2008/0005611 | A1 | 1/2008 | Solyanik |
| 2008/0040732 | A1 | 2/2008 | Akiyama et al. |
| 2008/0072077 | A1 | 3/2008 | Orr |
| 2008/0102957 | A1 | 5/2008 | Burman et al. |
| 2008/0133067 | A1 | 6/2008 | DeMay |
| 2008/0242423 | A1 | 10/2008 | Kerr et al. |
| 2008/0270569 | A1 | 10/2008 | McBride et al. |
| 2009/0011835 | A1 | 1/2009 | Hansen et al. |
| 2009/0064053 | A1* | 3/2009 | Crawford et al. ............. 715/854 |
| 2009/0069084 | A1 | 3/2009 | Reece et al. |
| 2009/0094076 | A1 | 4/2009 | Reddy |
| 2009/0115778 | A1 | 5/2009 | Ford et al. |
| 2010/0162201 | A1 | 6/2010 | Shnaiderman et al. |
| 2010/0269137 | A1 | 10/2010 | Nakajima et al. |
| 2010/0318855 | A1 | 12/2010 | Beg et al. |
| 2012/0155475 | A1 | 6/2012 | Vasseur et al. |
| 2012/0272220 | A1* | 10/2012 | Calcagno et al. ............. 717/125 |
| 2013/0338966 | A1 | 12/2013 | Spitzer |
| 2014/0009470 | A1 | 1/2014 | Spitzer et al. |
| 2014/0011581 | A1 | 1/2014 | Spitzer et al. |
| 2014/0012532 | A1 | 1/2014 | Spitzer et al. |
| 2014/0013094 | A1 | 1/2014 | Spitzer et al. |
| 2014/0013159 | A1 | 1/2014 | Spitzer et al. |

OTHER PUBLICATIONS

Advisory Action from U.S. Appl. No. 12/001,669, dated Oct. 14, 2011.
Final Office Action from U.S. Appl. No. 12/001,669, dated Jul. 21, 2011.
Notice of Allowance from U.S. Appl. No. 12/001,669, dated Aug. 31, 2012.
Non-Final Office Action from U.S. Appl. No. 12/001,669, dated Feb. 17, 2011.
Non-Final Office Action from U.S. Appl. No. 12/001,669, dated May 11, 2012.
Final Office Action from U.S. Appl. No. 12/001,504, dated Feb. 7, 2012.
Notice of Allowance from U.S. Appl. No. 12/001,504, dated Jun. 7, 2012.
Non-Final Office Action from U.S. Appl. No. 12/001,504, dated Aug. 5, 2011.
Advisory Action from U.S. Appl. No. 11/958,266, dated Feb. 22, 2012.
Final Office Action from U.S. Appl. No. 11/958,266, dated Oct. 19, 2010.
Final Office Action from U.S. Appl. No. 11/958,266, dated Dec. 12, 2011.
Notice of Allowance from U.S. Appl. No. 11/958,266, dated Jul. 2, 2012.
Non-Final Office Action from U.S. Appl. No. 11/958,266, dated Feb. 23, 2010.
Non-Final Office Action from U.S. Appl. No. 11/958,266, dated Jun. 21, 2011.
Non-Final Office Action from U.S. Appl. No. 12/352,268, dated Feb. 10, 2012.
Ribeiro-Filho, J. L. et al., "Game: A Framework for Programming Genetic Algorithms Applications," IEEE, 1994, pp. 840-845.
U.S. Appl. No. 13/525,119, filed Jun. 15, 2012.
U.S. Appl. No. 13/543,212, filed Jul. 6, 2012.
U.S. Appl. No. 13/543,196, filed Jul. 6, 2012.
U.S. Appl. No. 13/543,228, filed Jul. 6, 2012.
U.S. Appl. No. 13/543,242, filed Jul. 6, 2012.
U.S. Appl. No. 12/352,268, filed Jan. 12, 2009.
Unigraphics Basics, Nov. 14, 2004, retrieved from https://web.archive.org/web/20041114135544/http://homepages.cae.wisc.edu/~me232/ug/ug_basic.html.
Schmid, P., "Game Over? Core 2 Duo Knocks Out Athlon 64," Jul. 14, 2006, retrieved from http://www.tomshardware.com/reviews/core2-duo-knocks-athlon-64,1282-11.html.
Final Office Action from U.S. Appl. No. 12/352,268, dated Janaury 16, 2014.
Final Office Action from U.S. Appl. No. 12/352,268, dated Dec. 21, 2012.
Non-Final Office Action from U.S. Appl. No. 12/352,268, dated Jun. 19, 2014.
Non-Final Office Action from U.S. Appl. No. 12/352,268, dated Jun. 24, 2013.
Non-Final Office Action from U.S. Appl. No. 13/543,228, dated Jun. 13, 2014.
Non-Final Office Action from U.S. Appl. No. 13/543,242, dated Oct. 16, 2014.
Notice of Allowance from U.S. Appl. No. 13/543,228, dated Mar. 17, 2015.
Final Office Action from U.S. Appl. No. 13/543,212, dated Mar. 18, 2015.
Non-Final Office Action from U.S. Appl. No. 13/543,196, dated Mar. 18, 2015.
Final Office Action from U.S. Appl. No. 12/352,268, dated Jan. 28, 2015.
Non-Final Office Action from U.S. Appl. No. 13/543,212, dated Nov. 5, 2014.
Non-Final Office Action from U.S. Appl. No. 13/525,119, dated Feb. 5, 2015.
Hellerstein, J., "Optimizing Software Packages for Application Management," IEEE, 2008, pp. 1-8, Jul. 8, 2008.
Notice of Allowance from U.S. Appl. No. 13/543,228, dated Nov. 21, 2014.
Final Office Action from U.S. Appl. No. 13/543,242, dated May 15, 2015.
Notice of Allowance from U.S. Appl. No. 13/543,212, dated Jun. 8, 2015.
Non-Final Office Action from U.S. Appl. No. 13/525,119, dated Jul. 2, 2015.
Final Office Action from U.S. Appl. No. 13/543,196, dated Jul. 17, 2015.
Advisory Action from U.S. Appl. No. 13/543,196, dated Sep. 16, 2015.
Notice of Allowance from U.S. Appl. No. 13/543,212, dated Sep. 29, 2015.
Notice of Allowance from U.S. Appl. No. 13/543,242, dated Sep. 16, 2015.
Notice of Allowance from U.S. Appl. No. 13/525,119, dated Oct. 23, 2015.

* cited by examiner

SYSTEM, METHOD, AND COMPUTER PROGRAM PRODUCT FOR DETERMINING WHETHER PARAMETER CONFIGURATIONS MEET PREDETERMINED CRITERIA

FIELD OF THE INVENTION

The present invention relates to parameter analysis, and more particularly to determining whether parameter configurations meet predetermined criteria.

BACKGROUND

Many products in existence today include one or more parameters that influence an overall experience associated with the product. For example, computer games and other software may have many parameters that determine a quality of rendering, audio, game play, etc. However, current techniques for arranging the parameters associated with these products have been associated with various limitations.

For example, different parameter configurations may have to be individually tested in order to see whether they meet predetermined criteria. This may prove both time and resource intensive. There is thus a need for addressing these and/or other issues associated with the prior art.

SUMMARY

A system, method, and computer program product are provided for determining whether parameter configurations meet predetermined criteria. In use, predetermined criteria associated with a software element are identified. Additionally, it is determined whether each of a plurality of different parameter configurations meets the criteria, utilizing a directed acyclic graph (DAG).

DETAILED DESCRIPTION

Figure 1:
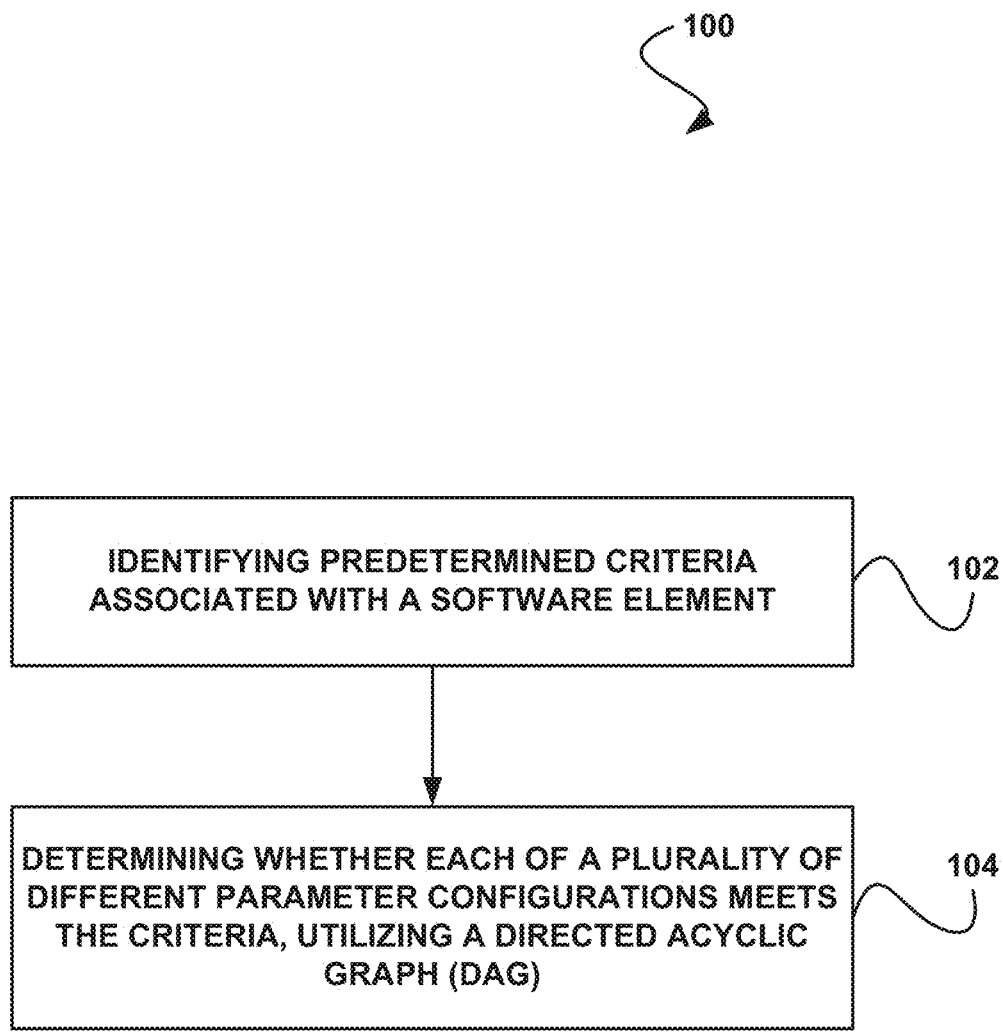
FIG. 1 shows a method for determining whether parameter configurations meet predetermined criteria, in accordance with one embodiment.

FIG. 1 shows a method 100 for determining whether parameter configurations meet predetermined criteria, in accordance with one embodiment. As shown in operation 102, predetermined criteria associated with a software element are identified. In one embodiment, the software element may include a software application (e.g., a program, etc.). For example, the software element may include a video game, an email client, a video playback program, etc.

Additionally, in one embodiment, the predetermined criteria may be associated with the ability of a plurality of predetermined parameters to run the software element. In another embodiment, the plurality of parameters may include any characteristics of a device (e.g., an object such as a desktop computer, laptop computer, tablet computer, personal digital assistant, cellular telephone, etc.). For example, the plurality of parameters may include hardware (e.g., a central processing unit (CPU), a graphics processing unit (GPU), random access memory (RAM), a motherboard, a display, a resolution, etc.) installed within the device, software (e.g., an operating system, drivers, etc.) installed within the device, etc.

Further, in one embodiment, one or more of the plurality of parameters may be independently configurable. For example, each of the plurality of parameters may be able to be altered independently from the other parameters. In another embodiment, each of the plurality of parameters may be utilized by the device to perform one or more actions. For example, each of the plurality of parameters may be utilized by the device to run the software element on the device.

Further still, in one embodiment, the predetermined criteria may include an ability of a plurality of predetermined parameters to run the software element at a predetermined frame rate (e.g., frames per second, etc.). In another embodiment, the predetermined criteria may include an ability of a plurality of predetermined parameters to run the software element at a particular settings level (e.g., a minimum settings level, a maximum settings level, a medium settings level, etc.) while maintaining a predetermined frame rate.

For example, different variations may exist for a given plurality of predetermined parameters, and a plurality of settings levels may be determined for and assigned to each variation. In one embodiment, the plurality of settings levels may be determined by calculating a monotonic set of presets for each variation of the plurality of predefined parameters. See, for example, U.S. application Ser. No. 13/525,119, which is hereby incorporated by reference in its entirety, and which describes exemplary methods for determining a monotonic set of presets based on a plurality of parameters. Additionally, the predetermined criteria may include an ability of a configuration of a plurality of predetermined parameters to run the software element at one or more presets of the monotonic set of presets while maintaining a particular frame rate.

In another embodiment, the settings may be associated with one or more parameters that have been determined based on the plurality of possible parameters associated with the device. See, for example, U.S. application Ser. No. 12/001,669, which is hereby incorporated by reference in its entirety, and which describes exemplary methods for determining application parameters based on hardware specifications.

Also, as shown in operation 104, it is determined whether each of a plurality of different parameter configurations meets the criteria, utilizing a directed acyclic graph (DAG). In one embodiment, determining whether each of a plurality of different parameter configurations meets the criteria may include creating a DAG that contains a plurality of directed nodes, where the nodes are directed based on one or more rules.

For instance, each of the plurality of nodes of the DAG may represent a combination of device parameters, and the nodes may be directed within the DAG based on the speed associated with each node, where the speed is determined based on the device parameters represented by the node. In another embodiment, the nodes may be directed in the DAG such that a first node of the DAG may point to a second node of the DAG when it is determined that the second node of the DAG is definitively faster in one or more respects (e.g., with respect to processing speed, etc.) than the first node of the DAG.

In addition, in one embodiment, each node in the DAG may represent a unique variation of a plurality of possible parameters associated with the device. For example, the plurality of possible parameters associated with the device may include a device CPU, a device GPU, and a device resolution, and each node in the DAG may represent a unique combination of a particular device CPU, device GPU, and device resolution. In this way, a first node pointing to a second node within the DAG signifies that the plurality of possible parameters associated with the device that are represented by the second node in the DAG offer definitively better processing speed and performance than the plurality of possible parameters associated with the device that are represented by the first node in the DAG. In another embodiment, nodes in the DAG may be arranged based on each node's track record with respect to earlier tests (e.g., based on a prior history including details as to whether the node met earlier criteria associated with software elements similar to the current software element, etc.).

Further, in one embodiment, determining whether each of a plurality of different parameter configurations meets the criteria may include calculating a score for each node in the DAG. For example, for each node in the DAG, a score may be calculated that indicates an expected number of additional nodes that may be affected by a determination made at that node with respect to the criteria. In another example, the score may indicate an expectation as to whether the node will meet the criteria (e.g., based on a prior history including details as to whether the node met earlier criteria associated with software elements similar to the current software element, etc.). In yet another example, the score may be calculated using one or more formulas.

In another embodiment, for each node in the DAG, a number of additional nodes that are unambiguously slower than the node (e.g., additional nodes that directly or indirectly point to the node) may be identified. In yet another embodiment, for each node in the DAG, a number of additional nodes that are unambiguously faster than the node (e.g., additional nodes that are directly or indirectly pointed to by the node) may be identified. In still another embodiment, the score for each node may be calculated utilizing the number of additional nodes that are unambiguously slower than the node and the number of additional nodes that are clearly faster than the node.

Further still, in one embodiment, determining whether each of a plurality of different parameter configurations meets the criteria may include determining a node in the DAG that has the highest score of the calculated scores. For example, a node in the DAG that has the highest score may be determined, where the node has the highest expected number of additional nodes that may be affected by the determination made at that node with respect to the criteria.

Also, in one embodiment, determining whether each of a plurality of different parameter configurations meets the criteria may include determining whether the node in the DAG determined to have the highest score of the calculated scores meets the criteria. For example, the combination of device parameters represented by the node may be tested to determine whether such parameters can run the software element at a predetermined frame rate. In another example, the combination of device parameters represented by the node may be tested to determine whether such parameters can run the software element at a particular settings level at the predetermined frame rate.

Additionally, in one embodiment, determining whether each of a plurality of different parameter configurations meets the criteria may include identifying all nodes in the DAG that are related to the node determined to have the highest score (e.g., all nodes in the DAG that may be affected by the determination as to whether the node in the DAG determined to have the highest score of the calculated scores meets the criteria). In another embodiment, determining whether each of a plurality of different parameter configurations meets the criteria may include altering a portion of the related nodes in response to the determination as to whether the node in the DAG determined to have the highest score of the calculated scores meets the criteria.

For example, if the node with the highest score is determined to not meet the criteria (e.g., the device parameters represented by the node cannot run the software element at the predetermined frame rate, etc.), all nodes determined to be unambiguously slower than the node in the DAG may also be determined to not meet the criteria. In another embodiment, all nodes determined to not meet the criteria may be recorded (e.g., by flagging the nodes, by creating a list of the nodes, etc.).

In another example, if the node with the highest score is determined to meet the criteria (e.g., the device parameters represented by the node can run the software element at the predetermined frame rate, etc.), all nodes determined to be unambiguously faster than the node in the DAG may also be determined to meet the criteria. In another embodiment, all nodes determined to meet the criteria may be recorded (e.g., by flagging the nodes, by creating a list of the nodes, etc.). In yet another embodiment, all nodes that have been determined to either meet or not meet the criteria may be identified as visited (e.g., by changing a bit (e.g., a "visited" bit, etc.) associated with the nodes to "true," etc.).

Further, in one embodiment, determining whether each of a plurality of different parameter configurations meets the criteria may include calculating a subsequent score for each unvisited node in the DAG and determining an unvisited node in the DAG that has the highest subsequent score. For example, anode in the DAG that has the highest score ad that also has a "visited" bit marked as "false" may be determined, where the node has the highest expected number of additional nodes that may be affected by the determination made at that node with respect to the criteria.

Further still, in one embodiment, determining whether each of a plurality of different parameter configurations meets the criteria may include determining all unvisited nodes in the DAG that are related to the unvisited node determined to have the highest score. In another embodiment, determining whether each of a plurality of different parameter configurations meets the criteria may include altering a portion of the related unvisited nodes in response to the determination as to whether the unvisited node in the DAG determined to have the highest score of the calculated scores meets the criteria.

Also, in one embodiment, the calculation of subsequent scores, the identification of an unvisited node in the DAG that has the highest score of the calculated subsequent scores, the determination of all unvisited nodes in the DAG that are related to the unvisited node determined to have the highest score, and the altering of a portion of the related unvisited nodes in response to the determination as to whether the unvisited node in the DAG determined to have the highest score meets the criteria may be repeated utilizing a greedy algorithm until all nodes in the DAG have a "visited" bit marked as "true."

Additionally, in one embodiment, past results obtained with criteria associated with one or more other software elements (e.g., one or more software elements determined to be similar to the current software element, etc.) may be correlated with later determinations to determine which nodes to test. For example, a history including earlier testing associated with the nodes and nodes earlier determined to have the highest score of selected nodes may be used to determine an optimal node to test instead of the node in the DAG determined to have the highest score of the calculated scores. In this way, a minimum number of nodes may be tested when determining whether all of the nodes in the DAG meet the criteria.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
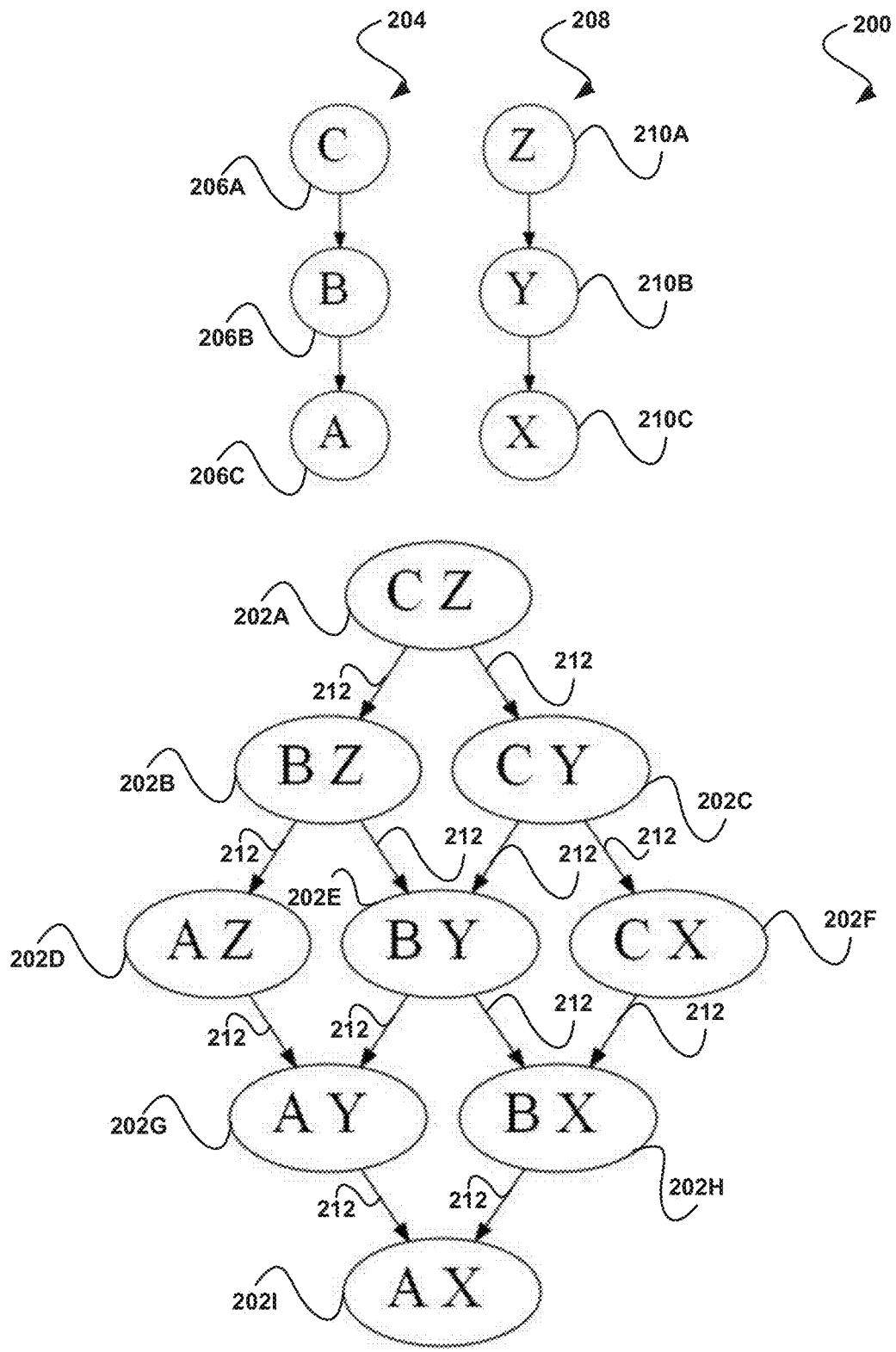
FIG. 2 shows an exemplary parameter DAG, in accordance with another embodiment.

FIG. 2 shows an exemplary parameter DAG 200, in accordance with another embodiment. As an option, the exemplary parameter DAG 200 may be carried out in the context of the functionality of FIG. 1. Of course, however, the exemplary parameter DAG 200 may be implemented in any desired environment. It should also be noted that the aforementioned definitions may apply during the present description.

As shown, the exemplary parameter DAG 200 includes a plurality of nodes 202A-I that each correspond to a unique combination of a first set 204 of variations 206A-C of a first component (e.g., a CPU type, etc.) of a personal computer and a second set 208 of variations 210A-C of a second component (e.g., a CPU type) of the personal computer. In one embodiment, the DAG 200 may include a directed graph with no directed cycles formed by the collection of nodes 202A-I (e.g., vertices, etc.) and a plurality of directed edges 212, such that there is no way to start at any node in the DAG 200 and follow a sequence of edges that eventually loops back that starting node again.

Additionally, the nodes in both the first set 204 of variations 206A-C of the first component and the second set 208 of variations 210A-C of the second component are directed based on processing speed, with slower nodes pointing to faster nodes. As such, the first node 206A is the slowest node in the first set 204, the second node 206B is faster than the first node 206A but slower than the third node 206C in the first set 204, and the third node 206C is the fastest node in the first set 204.

In one embodiment, the speed of each of the nodes 202A-I may be determined utilizing one or more algorithms, benchmark tests, manufacturer disclosures, etc. In another embodiment, the location of the nodes 202A-I within the DAG 200 (including which nodes point to which nodes) may be determined by analyzing properties of components in each node and comparing the overall processing speed of each of the nodes 202A-I.

Additionally, as shown, directed edges 212 point from nodes corresponding to slower unique combinations of parameter variations of the personal computer to nodes corresponding to unambiguously faster unique combinations of parameter variations of the personal computer. In this way, the bottom node 202I corresponds to the fastest unique combination of parameter variations of the personal computer, whereas the top node 202A corresponds to the slowest unique combination of parameter variations of the personal computer.

FIGS. 3A-G show node testing utilizing a DAG 300, in accordance with another embodiment. As an option, the node testing utilizing the DAG 300 may be carried out in the context of the functionality of FIGS. 1-2. Of course, however, the node testing utilizing the DAG 300 may be implemented in any desired environment. It should also be noted that the aforementioned definitions may apply during the present description.

Figure 3A:
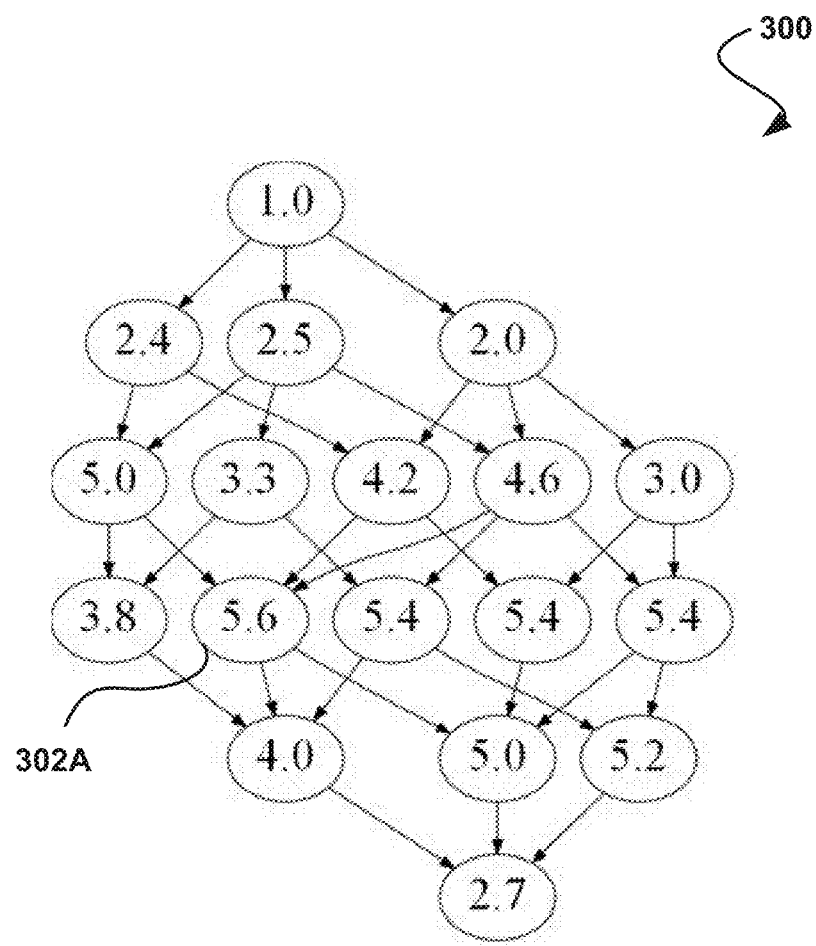
FIGS. 3A-G show node testing utilizing a DAG, in accordance with another embodiment.

As shown in FIG. 3A, for each node in the DAG 300, a score is determined, where the score is associated with an expected number of additional nodes that may be affected by a determination made at that node with respect to predetermined criteria. In one embodiment, for each node, the score associated with that node may be associated with the number of nodes that directly or indirectly point to that node, as well as the number of nodes that are directly or indirectly pointed to by that node.

In another embodiment, a score may be determined for each node in the DAG in response to a request to test each node in the DAG 300 against the predetermined criteria. For example, a score may be determined for each node in the DAG in response to a request to test whether the component variations represented by each node in the DAG 300 can display a predetermined image quality at a predetermined frame rate while running a particular application.

Additionally, in one embodiment, a score for each node may be determined utilizing an algorithm. Table 1 illustrates an exemplary algorithm for determining a score for a node in a DAG. Of course, it should be noted that the algorithm shown in Table 1 is set forth for illustrative purposes only, and thus should not be construed as limiting in any manner.

TABLE 1 # of expected nodes to be affected by a determination at a first node = (.5) * (# of nodes definitively weaker than the first node +1) + (.5) * (# of nodes definitively stronger than the first node +1)

Additionally, as shown in FIG. 3A, a first node 302A is determined to have the highest score of all the nodes in the DAG 300. Additionally, it is determined whether the first node 302A meets the predetermined criteria. For example, the first node 302A may be tested (e.g., utilizing one or more benchmark tests, etc.) to determine if the component variation represented by the node 302A can display a predetermined image quality at a predetermined frame rate while running a particular application.

Figure 3B:
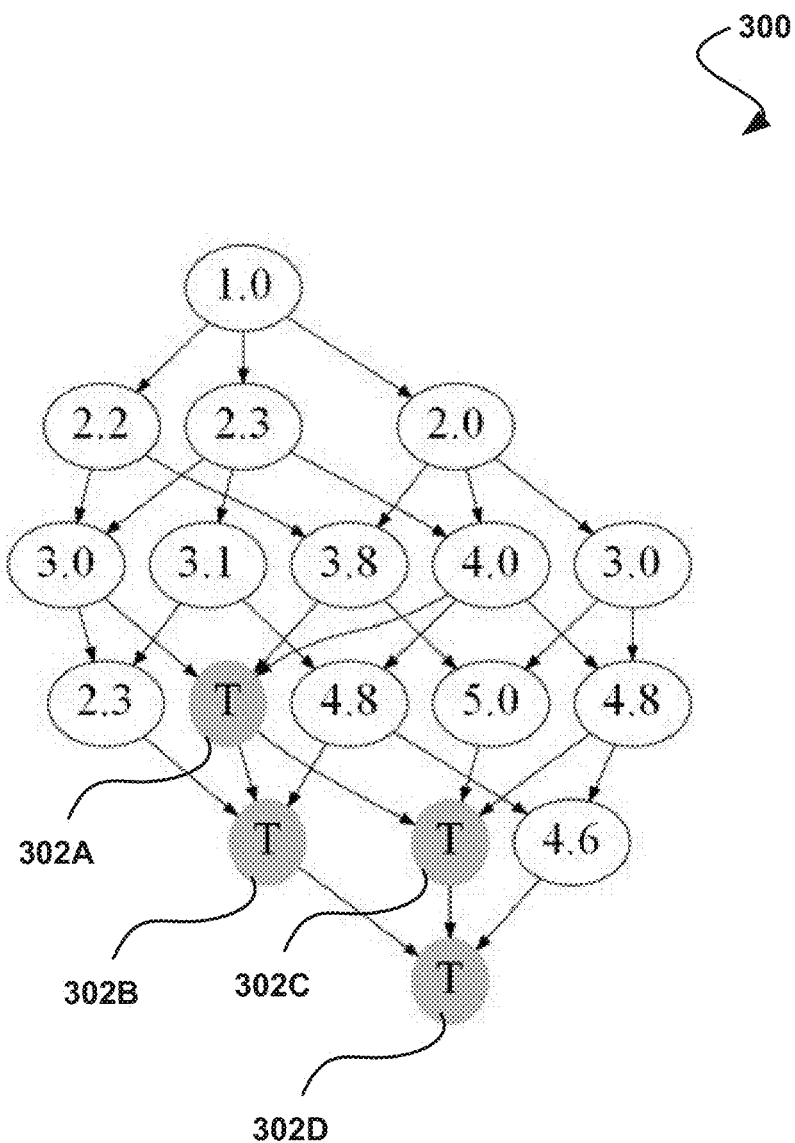

Further, as shown in FIG. 3B, it is determined that the first node 302A has met the predetermined criteria. For example, it may be determined that the component variation represented by the first node 302A can display a predetermined image quality at a predetermined frame rate while running a particular application. As a result, the first node 302A is labeled "true" to indicate that the first node 302A has met the criteria and that the first node 302A has been considered within the DAG 300.

Further still, additional nodes 302B, C, and D are determined to be definitively faster than the first node 302A based on their location within the DAG 300. For example, since additional nodes 302B, C, and D are all either directly or indirectly pointed to by the first node 302A, they are all definitively faster than the first node 302A. Also, the additional nodes 302B, C, and D determined to be definitively faster than the first node 302A are also labeled as "true" to indicate that the additional nodes 302B, C, and D have met the criteria and that the additional nodes 302B, C, and D have been considered within the DAG 300.

Figure 3C:
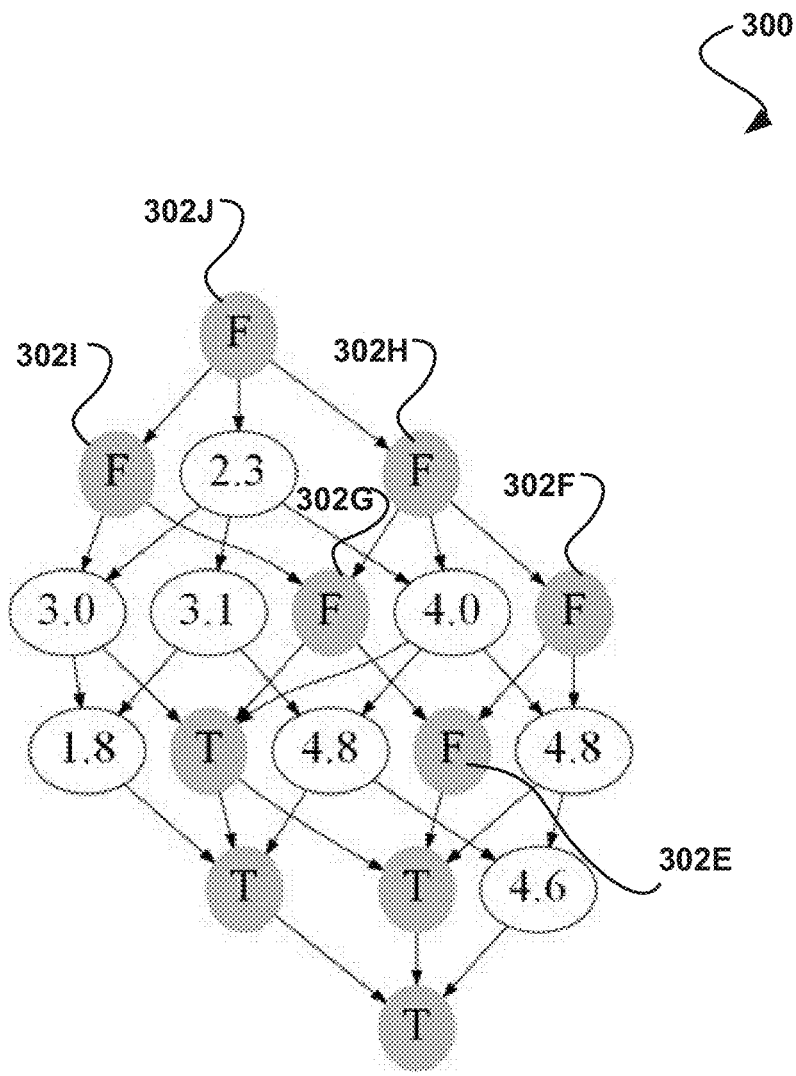

In addition, as shown in FIG. 3C, for each node in the DAG 300 that has not yet been considered, an updated score is determined, where the score is associated with an expected number of additional unconsidered nodes that may be affected by a determination made at that node with respect to predetermined criteria. Additionally, after determining the updated scores for the unconsidered nodes, a second node 302E is determined to have the highest score of all the nodes in the DAG 300 that have not yet been considered. For example, a set of all nodes within the DAG 300 that have not been labeled either "true" or "false" may be identified, and the node with the highest score may be identified from that set.

Additionally, it is determined whether the second node 302E meets the predetermined criteria. For example, the second node 302E may be tested (e.g., utilizing one or more benchmark tests, etc.) to determine if the component variation represented by the second node 302E can display a predetermined image quality at a predetermined frame rate while running a particular application.

Further, it is determined that the second node 302E has not met the predetermined criteria. For example, it may be determined that the component variation represented by the second node 302E cannot display a predetermined image quality at a predetermined frame rate while running a particular application. As a result, the second node 302E is labeled "false" to indicate that the second node 302E has not met the criteria and that the second node 302E has been considered within the DAG 300.

Further still, additional nodes 302F-J are determined to be definitively slower than the second node 302E based on their location within the DAG 300. For example, since additional nodes 302F-J all either directly or indirectly point to the second node 302E, they are all definitively slower than the second node 302E. Also, the additional nodes 302F-J determined to be definitively slower than the second node 302E are also labeled as "false" to indicate that the additional nodes 302F-J have not met the criteria and that the additional nodes 302F-J have been considered within the DAG 300.

Figure 3D:
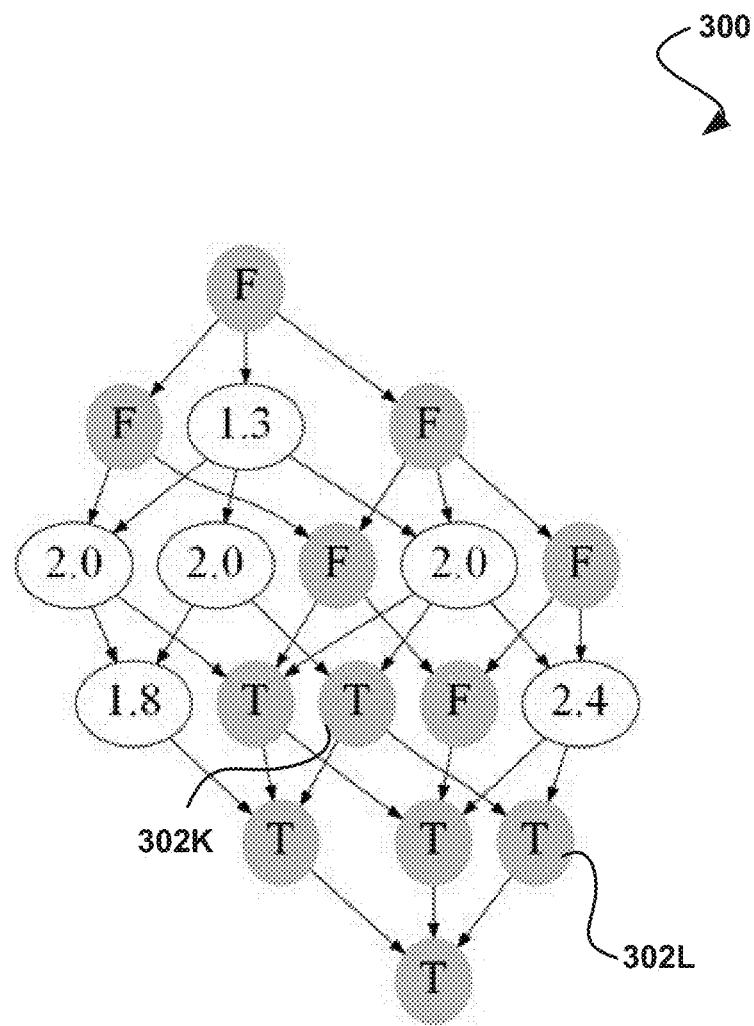

In addition, as shown in FIG. 3D, for each node in the DAG 300 that has not yet been considered, an updated score is determined, where the score is associated with an expected number of additional unconsidered nodes that may be affected by a determination made at that node with respect to predetermined criteria. Additionally, after determining the updated scores for the unconsidered nodes, a third node 302K is determined to have the highest score of all the nodes in the DAG 300 that have not yet been considered.

Additionally, it is determined whether the third node 302K meets the predetermined criteria. Further, it is determined that the third node 302K has met the predetermined criteria. For example, it may be determined that the component variation represented by the third node 302K can display a predetermined image quality at a predetermined frame rate while running a particular application. As a result, the third node 302K is labeled "true" to indicate that the third node 302K has met the criteria and that the third node 302K has been considered within the DAG 300.

Further still, additional node 302L is determined to be definitively faster than the third node 302K based on its location within the DAG 300. Also, the additional node 302L determined to be definitively faster than the third node 302K is also labeled as "true" to indicate that the additional node 302L has met the criteria and that the additional node 302L has been considered within the DAG 300.

Figure 3E:
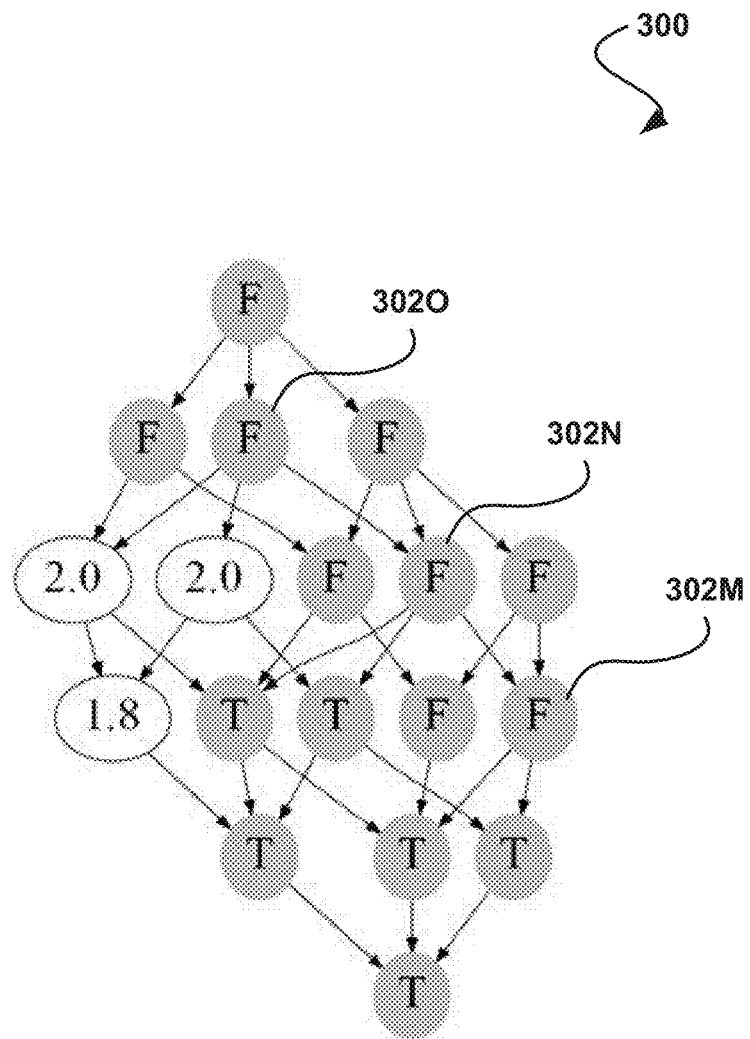

In addition, as shown in FIG. 3E, for each node in the DAG 300 that has not yet been considered, an updated score is determined, where the score is associated with an expected number of additional unconsidered nodes that may be affected by a determination made at that node with respect to predetermined criteria. Additionally, after determining the updated scores for the unconsidered nodes, a fourth node 302M is determined to have the highest score of all the nodes in the DAG 300 that have not yet been considered.

Additionally, it is determined whether the fourth node 302M meets the predetermined criteria. Further, it is determined that the fourth node 302M has not met the predetermined criteria. For example, it may be determined that the component variation represented by the fourth node 302M cannot display a predetermined image quality at a predetermined frame rate while running a particular application. As a result, the fourth node 302M is labeled "false" to indicate that the fourth node 302M has not met the criteria and that the fourth node 302M has been considered within the DAG 300.

Further still, additional nodes 302N and O are determined to be definitively slower than the fourth node 302M based on its location within the DAG 300. Also, the additional nodes 302N and O determined to be definitively slower than the fourth node 302M are also labeled as "false" to indicate that the additional nodes 302N and O have not met the criteria and that the additional nodes 302N and O have been considered within the DAG 300.

Figure 3F:
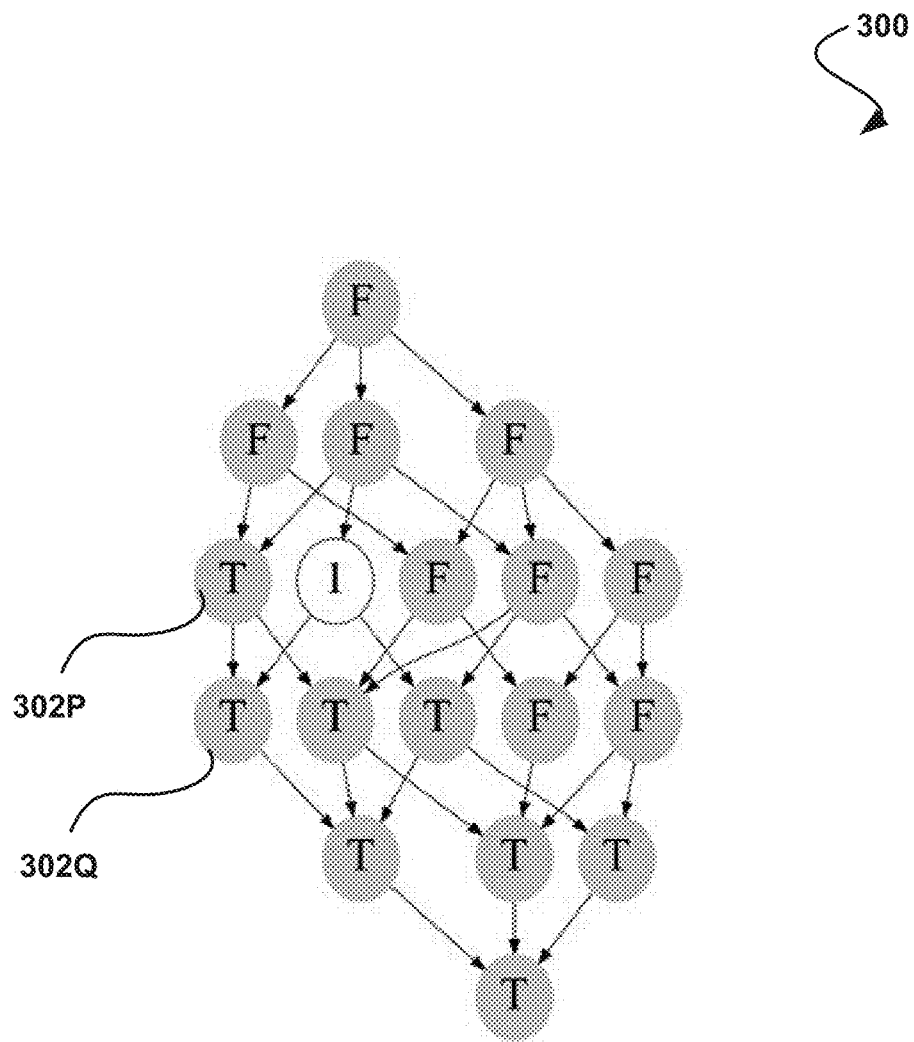

In addition, as shown in FIG. 3F, for each node in the DAG 300 that has not yet been considered, an updated score is determined, where the score is associated with an expected number of additional unconsidered nodes that may be affected by a determination made at that node with respect to predetermined criteria. Additionally, after determining the updated scores for the unconsidered nodes, a fifth node 302P is determined to have the highest score of all the nodes in the DAG 300 that have not yet been considered.

Additionally, it is determined whether the fifth node 302P meets the predetermined criteria. Further, it is determined that the fifth node 302P has met the predetermined criteria. For example, it may be determined that the component variation represented by the fifth node 302P can display a predetermined image quality at a predetermined frame rate while running a particular application. As a result, the fifth node 302P is labeled "true" to indicate that the fifth node 302P has met the criteria and that the fifth node 302P has been considered within the DAG 300.

Further still, additional node 302Q is determined to be definitively faster than the fifth node 302P on its location within the DAG 300. Also, the additional node 302Q determined to be definitively faster than the fifth node 302P is also labeled as "true" to indicate that the additional node 302Q has met the criteria and that the additional node 302Q has been considered within the DAG 300.

Figure 3G:
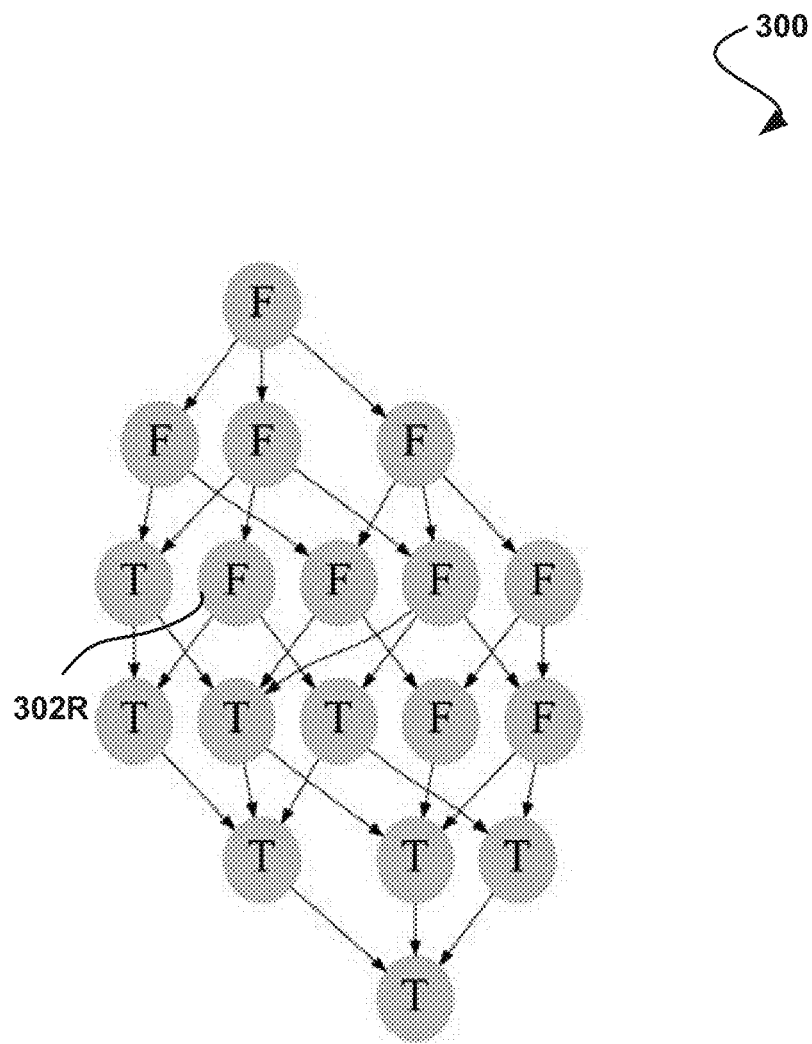

Also, as shown in FIG. 3G, for each node in the DAG 300 that has not yet been considered, an updated score is determined, where the score is associated with an expected number of additional unconsidered nodes that may be affected by a determination made at that node with respect to predetermined criteria. Additionally, after determining the updated scores for the unconsidered nodes, a sixth node 302R is determined to have the highest score of all the nodes in the DAG 300 that have not yet been considered.

Additionally, it is determined whether the sixth node 302R meets the predetermined criteria. Further, it is determined that the sixth node 302R has not met the predetermined criteria. For example, it may be determined that the component variation represented by the sixth node 302R cannot display a predetermined image quality at a predetermined frame rate while running a particular application. As a result, the sixth node 302R is labeled "false" to indicate that the sixth node 302R has not met the criteria and that the sixth node 302R has been considered within the DAG 300.

Further still, it is determined that the sixth node 302R is the last remaining node in the DAG 300 that had not been considered, and a final result is achieved. In this way, it may be determined whether the eighteen nodes in the DAG 300 meet the criteria while only six nodes in the DAG 300 are actually tested. Therefore, the amount of nodes to be tested within the DAG 300 is minimized.

Figure 4:
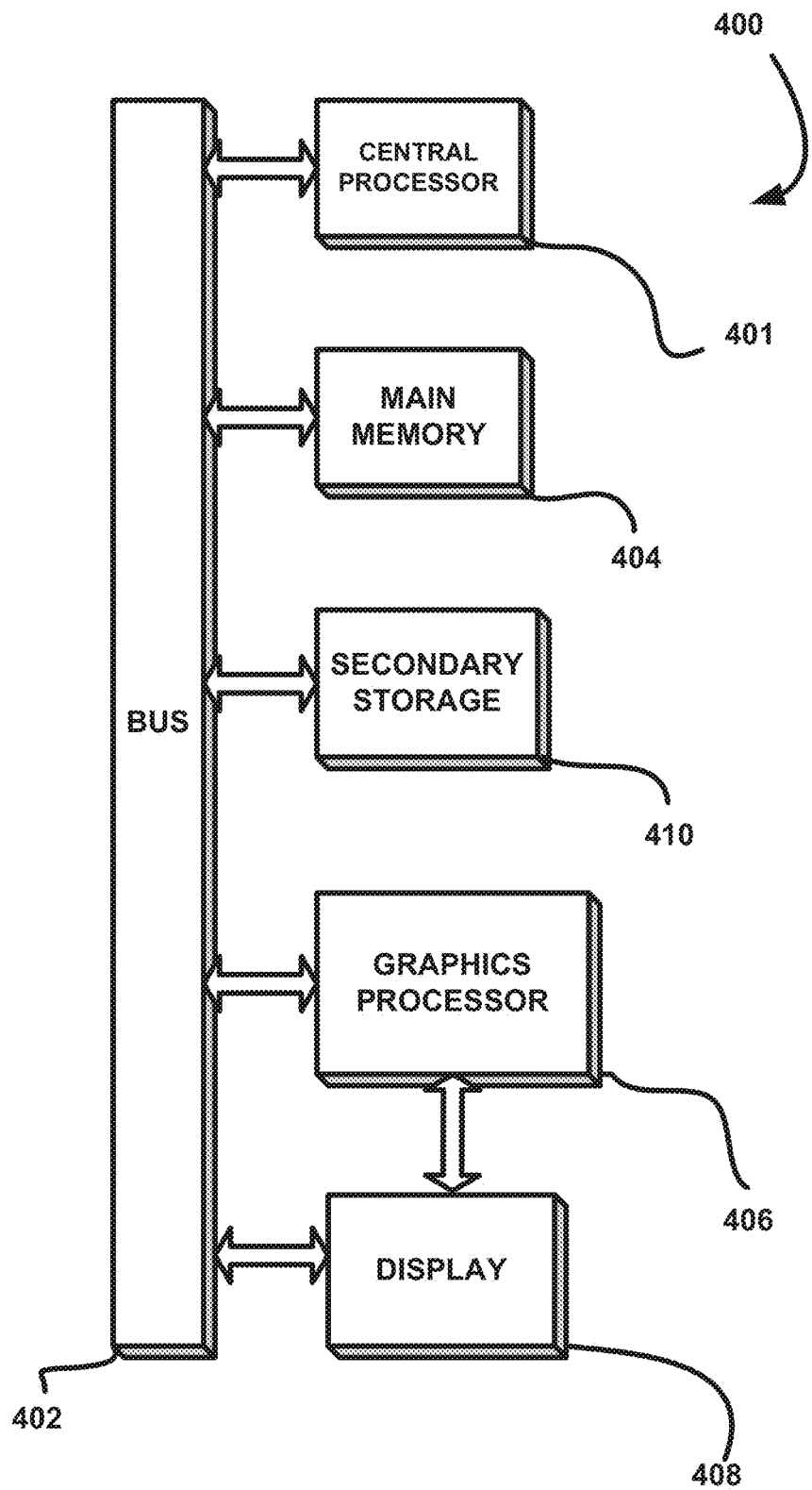
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying predetermined criteria associated with a software element, the criteria including an ability of a plurality of predetermined parameters to run the software element at a predetermined frame rate; and
    determining whether each of a plurality of different configurations of the plurality of predetermined parameters meets the criteria, utilizing a directed acyclic graph (DAG), including:
        creating the DAG that includes a plurality of directed nodes, where each of the plurality of directed nodes in the DAG represents a unique configuration of the plurality of predetermined parameters,
        directing the plurality of nodes within the DAG based on a speed associated with each node, where the speed is determined for each node based on the plurality of predetermined parameters represented by the node,
        for each node in the DAG, calculating a score for the node based on a number of additional nodes within the DAG that are slower than the node and a number of additional nodes within the DAG that are faster than the node,
        determining a high score node in the DAG that has a highest calculated score,
        determining whether the high score node in the DAG is able to run the software element at the predetermined frame rate,
        flagging the high score node and the additional nodes within the DAG that are slower than the high score node as being determined to not meet the criteria when it is determined that the high score node is not able to run the software element at the predetermined frame rate, and
        flagging the high score node and the additional nodes within the DAG that are faster than the high score node as being determined to meet the criteria when it is determined that the high score node is able to run the software element at the predetermined frame rate.

2. The method of claim 1, wherein the software element includes a software application.

3. The method of claim 1, wherein the plurality of parameter values comprise hardware installed within the device.

4. The method of claim 1, wherein the score indicates an expected number of additional nodes that may be affected by a determination made at that node with respect to the criteria.

5. The method of claim 1, wherein all nodes that have been determined to either meet or not meet the criteria are identified as visited.

6. The method of claim 5, wherein determining whether each of a plurality of different parameter configurations meets the criteria includes calculating a subsequent score for each unvisited node in the DAG and determining an unvisited node in the DAG that has the highest subsequent score.

7. The method of claim 5, further comprising changing a bit associated with the nodes identified as visited to "true."

8. The method of claim 1, wherein the score calculated for a first node in the DAG is further associated with the number of nodes that directly or indirectly point to the first node, as well as the number of nodes that are directly or indirectly pointed to by the first node.

9. The method of claim 1, wherein the score calculated for a first node further indicates the first node will meet the criteria based on a prior history of the first node meeting earlier criteria associated with another software element similar to the software element.

10. The method of claim 1, wherein all nodes that have been determined to meet the criteria are recorded.

11. The method of claim 1, wherein all nodes that have been determined to not meet the criteria are recorded.

12. The method of claim 1, wherein the criteria tests whether a node can display a predetermined image quality at the predetermined frame rate while running a particular application.

13. A computer program product embodied on a non-transitory computer readable medium, comprising code for:
- identifying predetermined criteria associated with a software element, the criteria including an ability of a plurality of predetermined parameters to run the software element at a predetermined frame rate; and
- determining whether each of a plurality of different configurations of the plurality of predetermined parameters meets the criteria, utilizing a directed acyclic graph (DAG), including:
  - creating the DAG that includes a plurality of directed nodes, where each of the plurality of directed nodes in the DAG represents a unique configuration of the plurality of predetermined parameters,
  - directing the plurality of nodes within the DAG based on a speed associated with each node, where the speed is determined for each node based on the plurality of predetermined parameters represented by the node,
  - for each node in the DAG, calculating a score for the node based on a number of additional nodes within the DAG that are slower than the node and a number of additional nodes within the DAG that are faster than the node,
  - determining a high score node in the DAG that has a highest calculated score,
  - determining whether the high score node in the DAG is able to run the software element at the predetermined frame rate,
  - flagging the high score node and the additional nodes within the DAG that are slower than the high score node as being determined to not meet the criteria when it is determined that the high score node is not able to run the software element at the predetermined frame rate, and
  - flagging the high score node and the additional nodes within the DAG that are faster than the high score node as being determined to meet the criteria when it is determined that the high score node is able to run the software element at the predetermined frame rate.

14. A system, comprising:
- a processor for:
- identifying predetermined criteria associated with a software element, the criteria including an ability of a plurality of predetermined parameters to run the software element at a predetermined frame rate; and
- determining whether each of a plurality of different configurations of the plurality of predetermined parameters meets the criteria, utilizing a directed acyclic graph (DAG), including:
  - creating the DAG that includes a plurality of directed nodes, where each of the plurality of directed nodes in the DAG represents a unique configuration of the plurality of predetermined parameters,
  - directing the plurality of nodes within the DAG based on a speed associated with each node, where the speed is determined for each node based on the plurality of predetermined parameters represented by the node,
  - for each node in the DAG, calculating a score for the node based on a number of additional nodes within the DAG that are slower than the node and a number of additional nodes within the DAG that are faster than the node,
  - determining a high score node in the DAG that has a highest calculated score,
  - determining whether the high score node in the DAG is able to run the software element at the predetermined frame rate,
  - flagging the high score node and the additional nodes within the DAG that are slower than the high score node as being determined to not meet the criteria when it is determined that the high score node is not able to run the software element at the predetermined frame rate, and
  - flagging the high score node and the additional nodes within the DAG that are faster than the high score node as being determined to meet the criteria when it is determined that the high score node is able to run the software element at the predetermined frame rate.

15. The system of claim 14, wherein the processor is coupled to a memory via a bus.

* * * * *